United States Patent
Gray et al.

(10) Patent No.: US 10,795,327 B2
(45) Date of Patent: Oct. 6, 2020

(54) SYSTEM AND METHOD FOR CONTEXT-DRIVEN PREDICTIVE SIMULATION SELECTION AND USE

(71) Applicant: General Electric Company, Schenectady, NY (US)

(72) Inventors: Steven Robert Gray, Niskayuna, NY (US); John Robert Hoare, Latham, NY (US); Justin Michael Foehner, Penfield, NY (US); Huan Tan, Clifton Park, NY (US); Shiraj Sen, Clifton Park, NY (US); Romano Patrick, Niskayuna, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 387 days.

(21) Appl. No.: 15/870,560

(22) Filed: Jan. 12, 2018

(65) Prior Publication Data
US 2019/0219972 A1    Jul. 18, 2019

(51) Int. Cl.
*G06F 17/00* (2019.01)
*G05B 13/04* (2006.01)
(Continued)

(52) U.S. Cl.
CPC ............ *G05B 13/04* (2013.01); *B25J 9/1602* (2013.01); *G05B 13/027* (2013.01); *H04W 4/025* (2013.01); *H04W 4/38* (2018.02)

(58) Field of Classification Search
CPC ...... B25J 9/1602; G05B 13/027; G05B 13/04; G05B 2219/40314; G05D 1/0011;
(Continued)

(56) References Cited

U.S. PATENT DOCUMENTS 9,796,091 B1 * 10/2017 Soo ......................... B25J 9/1689
9,880,553 B1 *  1/2018 Hoffmann ............ G05D 1/0038
(Continued)

FOREIGN PATENT DOCUMENTS

WO    2017106293 A2    6/2017
WO    2017136613 A1    8/2017

OTHER PUBLICATIONS

Zhu et al., "Context-Driven Testing Approach for Composability of Simulation Model", System Simulation and Scientific Computing 7th International Conference, http://eeexplore.ieee.org/document/4675332/, Oct. 10-12, 2008.
(Continued)

*Primary Examiner* — Harry Y Oh
(74) *Attorney, Agent, or Firm* — Fletcher Yoder, P.C.

(57) ABSTRACT

The present approach employs a context-aware simulation platform to facilitate control of a robot remote from an operator. Such a platform may use the prior domain/task knowledge along with the sensory feedback from the remote robot to infer context and may use inferred context to dynamically change one or both of simulation parameters and a robot-environment-task state being simulated. In some implementations, the simulator instances make forward predictions of their state based on task and robot constraints. In accordance with this approach, an operator may therefore issue a general command or instruction to a robot and based on this generalized guidance, the actions taken by the robot may be simulated, and the corresponding results visually presented to the operator prior to evaluate prior to the action being taken.

20 Claims, 5 Drawing Sheets

(51) Int. Cl.
  *H04W 4/38* (2018.01)
  *B25J 9/16* (2006.01)
  *H04W 4/02* (2018.01)
  *G05B 13/02* (2006.01)

(58) Field of Classification Search
  CPC ........ G05D 1/0088; G05D 2201/0207; H04W 4/025; H04W 4/38
  See application file for complete search history.

(56) References Cited

U.S. PATENT DOCUMENTS

| | | | |
|---|---|---|---|
| 2013/0046415 A1* | 2/2013 | Curtis | H02J 3/387 700/297 |
| 2013/0238304 A1 | 9/2013 | Glinsky | |
| 2015/0199458 A1 | 7/2015 | Bacon et al. | |
| 2016/0059412 A1 | 3/2016 | Oleynik | |
| 2016/0096272 A1* | 4/2016 | Smith | G06N 3/008 700/253 |
| 2016/0221191 A1* | 8/2016 | Ota | B25J 9/1664 |
| 2017/0025040 A1* | 1/2017 | Maturana | G09B 19/0053 |
| 2017/0203438 A1* | 7/2017 | Guerin | B25J 9/1605 |
| 2018/0348716 A1* | 12/2018 | Perez | G05B 13/027 |

OTHER PUBLICATIONS

Mainprice et al., "Human-Robot Collaborative Manipulation Planning Using Early Prediction of Human Motion", Intelligent Robots and Systems (IROS) International Conference, http://ieeexplore.ieee.org/abstract/document/6696368/, Nov. 3-7, 2013.

Lee et al., "Context-Driven Control Algorithms for Scalable Simulation of Human Activities in Smart Homes", Ubiquitous Intelligence and Computing 10th International Conference on Autonomic and Trusted Computing (UIC/ATC), http://ieeexplore.ieee.org/document/6726221/, Dec. 18-21, 2013.

* cited by examiner

SYSTEM AND METHOD FOR CONTEXT-DRIVEN PREDICTIVE SIMULATION SELECTION AND USE

BACKGROUND

The subject matter disclosed herein relates to the monitoring and/or control of robots at a distance.

Robots may be used to perform remote tasks, such as inspection tasks, maintenance tasks, and so forth, remote from a controlling agent (e.g., a human operator). For example, there may be circumstances where a human operator will be required to remotely operate either a robot or a fleet of robots located in geographically remote areas or otherwise remote from the operator. Having geographically distributed human-robot teams work reliably is challenging because of the difficulty of supervising and executing tasks over high-latency and/or unreliable communication channels that may be associated with such remote operation.

For example, high-latency communication links may preclude direct teleoperation of a robot. In particular, a high-latency link may allow inadvertent events to occur before a remote operator is even aware that something unintended has occurred and/or before the operator has even been shown the possibility or actuality of an unintended consequence.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the disclosure may encompass a variety of forms that may be similar to or different from the embodiments set forth below.

In one embodiment, a robot navigation system is provided. In accordance with this embodiment, the robot navigation system includes a robot configured to be operated from a remote location, the robot comprising one or more sensors, and a processing component. The processing component is configured to estimate a context based on one or more factors, wherein the estimation of the context is based at least on a state of the robot and at least one contemplated operator instruction; based on the context, parameterize or adapt one or more simulation routines; generate a state prediction based on results of the one or more simulation routines; and generate an output based on the state prediction for review by an operator.

In a further embodiment, a processor-based method is provided for remotely operating a robot. In accordance with this method, for a contemplated operator instruction for the robot a context is estimated based on one or more factors. The estimation of the context is based at least on a state of the robot and the contemplated operator instruction. Based on the context, one or more processor-implemented simulation routines are parameterized or adapted. A state prediction is generated based on results of the one or more simulation routines. An output based on the state prediction is generated for review by an operator.

In an additional embodiment, one or more non-transitory computer-readable media encoding processor-executable routines are provided. In accordance with this embodiment, the routines, when executed by a processor, cause acts to be performed comprising: estimating a context based on one or more factors, wherein the estimation of the context is based at least on a state of a robot and one or more contemplated operator instructions; based on the context, parameterizing or adapting one or more processor-implemented simulation routines; generating a state prediction based on results of the one or more simulation routines; and generating an output based on the state prediction for review by an operator.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

High-latency communication links (e.g., links having a latency of 20 seconds or more) may limit or preclude direct teleoperation of a robot by a human operator. In accordance with the present approach, to effectively control a robot over a high-latency link, an operator may be provided with a prediction of the results of an action prior to the corresponding instruction being sent. In the context of a high-latency link, an unintended or problematic outcome may result from an instruction absent such a prediction, such as due to visualization of the remote environment or the effects of the robots actions not being presented to the operator in a timely manner. In particular, being able to preview results of an action allows the operator to preview and evaluate the outcome of potential actions before they take place on the physical robot.

However, such simulation is resource intensive. In accordance with the present approach steps may be taken to remediate the resource intensiveness of simulation by opting for lower-fidelity simulations when possible. This enables faster than real-time simulation and simulation with a variety of starting conditions (e.g., Monte Carlo simulations) to mitigate uncertainty. Additionally, different tasks to be performed by the robot may be suitably modeled using different simulation configurations, which can be leveraged in the present approach. By providing relevant resources to the important aspects of simulation, simulation can occur at real time or better (i.e., predictively) to provide an accurate prediction of outcomes without requiring an intractable amount of computational resources.

With the preceding in mind, the present approach employs a context-aware simulation platform to facilitate control of a robot remote from an operator. Such a platform, as discussed herein may have some or all of the following characteristics: (1) use of the prior domain/task knowledge along with the sensory feedback from the remote robot to infer context (i.e., context estimation); (2) use of context to dynamically change both the simulation parameters (such as simulation fidelity, uncertainty, etc.) as well as the parts of the robot-environment-task state being simulated (i.e., context-driven simulation adaptation); and/or (3) providing raw sensory data from the remote robot to the various simulator instances to maintain an updated estimate of the state of the robot. In some implementations, the simulator instances make forward predictions of their state based on task and robot constraints (i.e., a state prediction). In accordance with this approach, an operator may therefore issue a general command or instruction to a robot and based on this generalized guidance, the actions taken by the robot may be simulated, and the corresponding results visually presented to the operator to evaluate prior to the action being taken.

Further, the present approach allows the online adaptation of a simulated system so as to provide relevant information to a human operator to achieve the task. For instance, a safety controller pertaining to a robot base can be disabled when the base is not going to be moving. Similarly, a rear-facing camera does not need to be simulated when the robot is manipulating something in front. In this manner, characteristics, operations, or data that are not relevant in a given context may be excluded from consideration and simulation, thereby reducing the resource load of the overall process.

As used herein, a robot may include unmanned or robotic devices, such as ground-based mobile robots, including those with legs, wheels, tracks, etc., unmanned aerial vehicles (UAVs), including fixed wing and rotary wing vehicles, unmanned submersible vehicles (USVs), which may swim or move along the floor of the body of liquid, or other autonomously moving vehicles that may be characterized as drones or robots. For simplicity, to the extent the terms "drone" and "robot" are used herein, it should be appreciated that this terminology is intended to encompass all variations of UAVs, USVs, robotic devices, and so forth that are capable of movement with partial or limited human oversight or of full remote control by a human operator. Programmable or automated movement of the robot, when employed, can be based on either locally generated path waypoints or guidance or based upon path guidance and waypoints generated by a remote system or human operator and communicated to the robot.

In accordance with present approaches, such devices may be operated to move along a flight plan or path associated with a task to be performed, such as an inspection or maintenance task. As part of navigating and/or performing a task, the robot may use onboard sensors to acquire video or still image data, LIDAR data, acoustic data, spectroscopic data, temperature or pressure data, or other data that can be acquired by sensors or cameras that can be affixed to or otherwise provided on the robot. The positions and orientations of the sensors can typically be adjusted based on operator judgement when an operator is involved in the operation of the robot and/or on the robot's own situational awareness or programming (e.g., motion in a given direction causes a camera to be operated or directed in that direction).

By way of example, and to provide a real-world context to facilitate explanation, an inspection and maintenance context for the present approach may be discussed herein. It should be understood, however, that such examples are provided merely by way of illustration, and the present approach is applicable and extendable to any context in which a robot moves or acts under the full or partial guidance of a remote human operator. Thus, the present approach is not limited in any way to any particular examples described herein.

With respect to such useful examples, however, a remotely operated robot as discussed herein may be operated in the vicinity of assets including, but not limited to, power generation assets, communication assets, transportation assets, mining or underground pumping assets, manufacture or construction assets and so forth.

To the extent the phrases "flight plan" or "path" are used herein, it should be appreciated that these phrases does not necessitate aerial movement, but instead relate to any one-dimensional (1D) (such as along a track), two-dimensional (2D) (such as along a defined or undefined planar route), three-dimensional (3D) (such as movement in the air, under water, or on a structure in where depth or altitude is also traversable), or four-dimensional (4D) (such as where there are defined temporal aspects that may characterize a velocity, acceleration, or a time on station at a waypoint) path or route along which a robot moves as part of an navigation plan, such as to perform an inspection, either as part of an automated process or while under the control of a human operator. Thus, a path as used herein may be characterized as any 1D, 2D, 3D, or 4D route or path along which device such as a drone or robot is moved to perform a task, such as a sensor-based inspection of an asset. Such a path may be adaptive, as discussed herein, and may consist of one or more waypoints along which the robot proceeds in an ordered fashion, with the sequence and location of the waypoints defining the path or route. It should be appreciated that such a path may also incorporate not only temporal and/or spatial locations, but also orientation and/or alignment instructions for movement along the path and/or to exhibit at a given waypoint. Thus, the path may also specify parameters such as roll, pitch, and yaw for the robot to exhibit at different points along the path as well as two- or three-dimensional alignment characteristics that may relate to the direction in which a sensor or camera is pointing at a point along the path. Thus, the path may address not only where or when a robot is with respect to an target site (e.g., an inspection site) but, at a given location or waypoint, the direction the robot is facing or otherwise oriented with respect to.

Figure 1:
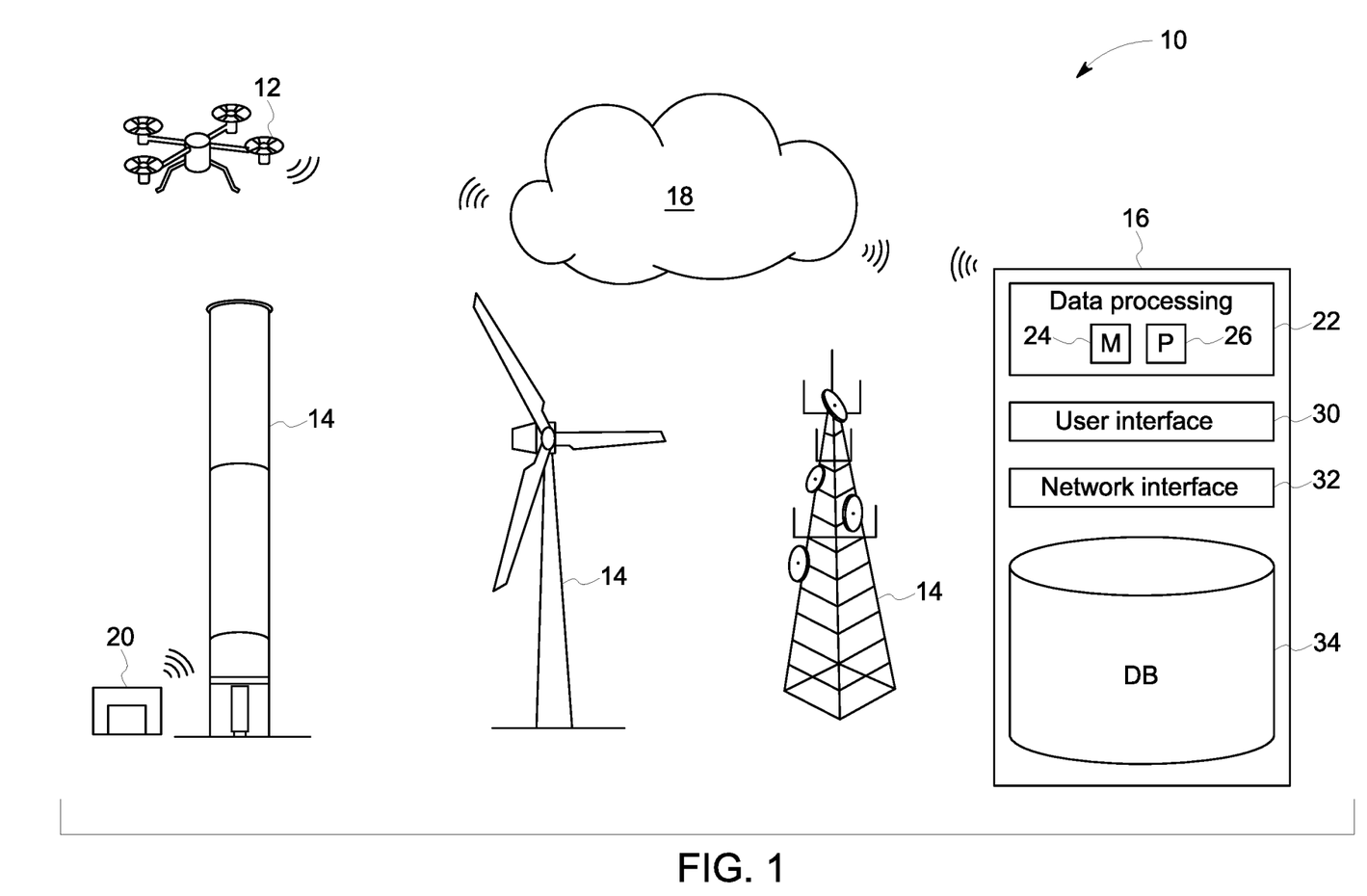
FIG. 1 illustrates various task sites at which a robot may be used to perform tasks, such as inspection and maintenance tasks, in accordance with aspects of the present disclosure.

With the preceding in mind, and turning to the figures, FIG. 1 depicts aspects of an inspection system 10 employing one or more robots 12 suitable for navigating with respect to and inspecting one or more assets 14, such as a wind turbine generator, radio tower, smokestack, or other suitable asset.

In the depicted example a remote server or servers 16, accessible via a cloud 18 (e.g., a network interface for accessing one or more remote servers virtual machines, etc. for storage, computing, or other functionality) are depicted. Such servers 16 may communicate with the one or more robots 12 to coordinate operation of one or more robots 12, such as for inspection or repair of an asset 14. In one embodiment, the robot(s) 12 have onboard cellular or network connectivity and can communicate with the remote server 16 prior to beginning, during, and/or after a task (e.g., an inspection or repair), such as to facilitate navigation of the robot(s) 12. In some instances, changes to a path or other actions performed by the robot(s) 12 may be determined by a processor internal to the robot 12, i.e., onboard, such as in the event the robot 12 is operating outside of communication range from the remote server 16.

As shown, in some embodiments, the system may also include a docking station 20 (e.g., robot garage), disposed on or near the asset 14, for short term or long term storage of the robot 12 before and/or after an inspection and/or maintenance task. In some embodiments, the docking station 20 may be in communication with the remote server 16 via the cloud 18. If the robot 12 relies on a battery for power, the docking station 20 may also include a power source for charging the robot's 12 battery.

In the depicted example, the remote server 16 is a remote computing device in communication with the robot(s) 12 via the cloud 18. Though only a single remote server 16 is shown in FIG. 1, it should be understood that the functions performed by the remote server 16 may be performed by multiple remote servers 16 and/or by virtualized instances of a server environment. In the instant embodiment, the remote server 16 includes a data processing system 22, which may include a memory component 24 and a processor 26, for processing data received from the robot 12 and/or instructions to be relayed to the robot 12. As is described in more detail below, in some embodiments, the robot 12 may provide raw or processed sensor data (e.g., videos, images, LIDAR data, depth sensor data, acoustic data, spectroscopic data, or other relevant sensor or camera data) to the remote server 16 that can be used in generating simulations useful to an operator in assessing instructions to be communicated to the robot(s) 12. By interacting with and/or observing such simulations, the operator may in turn confirm or alter instructions that are then conveyed to the robot 12.

The remote server(s) 16 are also depicted as including a user interface 30 by which a user may remotely issue instructions or commands to the server(s) 16 and robot(s) 12. The user interface 30 may present or include a representation of the sensed environment local to the robot 12 and/or, as discussed herein, simulations of the environment local to the robot after the robot 12 performs an action contemplated by the operator. Instructions or commands generated by interaction with the interface 30 may be acted upon by the remote server 16 to control an aspect of the operation of the robot 12. In addition, the remote server(s) 16 are depicted as including a network interface 32 that may be used to communicate with components of the overall inspection system (such as other servers 16, a robot 12, storage devices, processing components, and so forth) over a local network, a wide area network, the Internet, and so forth.

In the depicted example, the data processing system 22 and the database 34 are depicted as part of a single or common processor-based system. However, the depicted functionalities, as well as other functionalities discussed herein, may be implemented in a distributed or dispersed manner, with certain aspects being local to the asset 14, to the robot 12, to an operational facility and/or other locations remote from the asset 14. In such distributed implementations, the depicted aspects may still be communicatively linked, such as over one or more network connections, as discussed herein.

Figure 2:
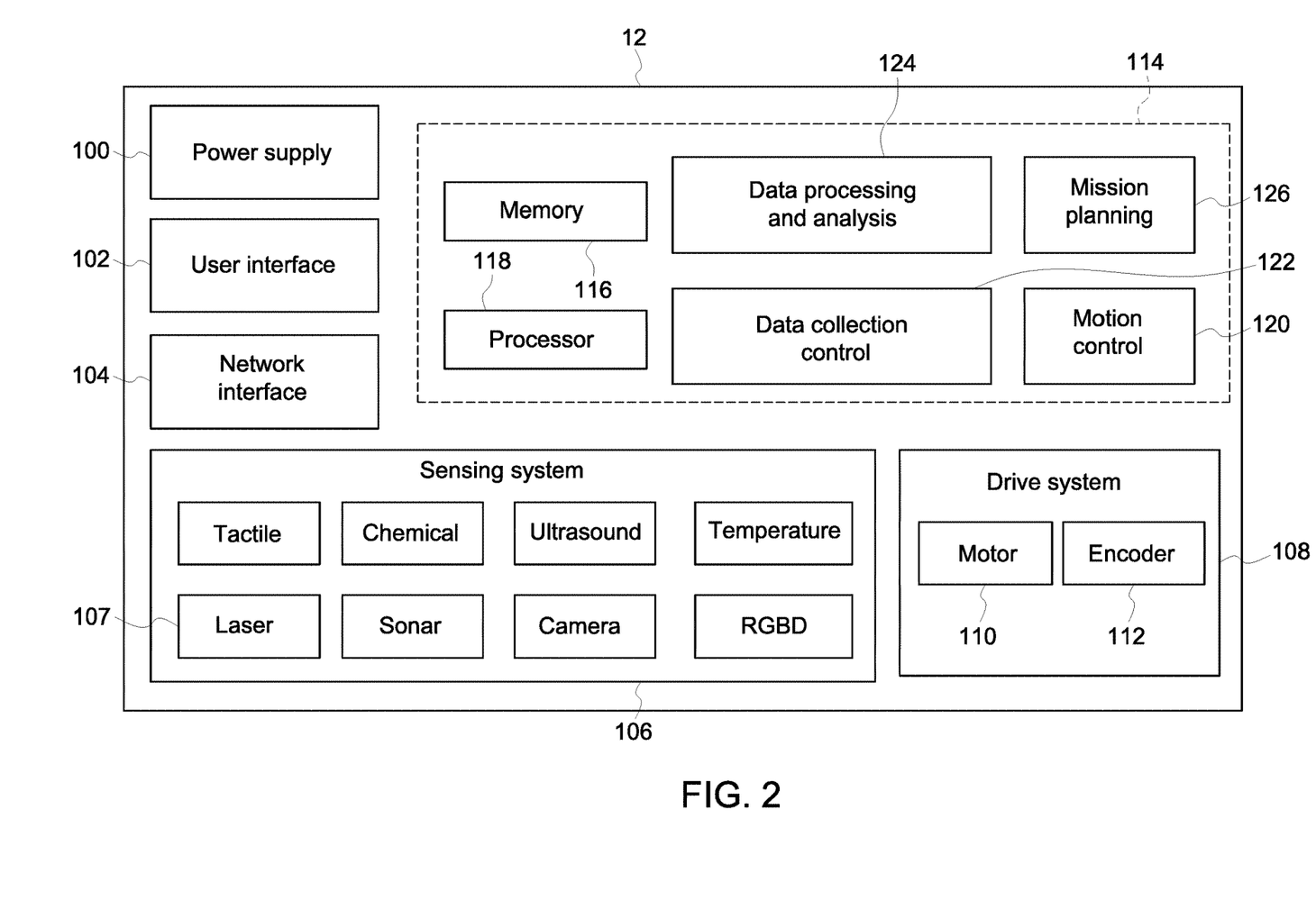
FIG. 2 is a schematic of a robot of FIG. 1, in accordance with aspects of the present disclosure.

FIG. 2 is a schematic of an embodiment of a robot 12 shown in FIG. 1. It should be understood, however, that other embodiments of the robot 12 are envisaged having additional components, fewer components, and/or different combinations of components. As shown, the robot 12 includes a power supply 100 to provide power for the operation of the robot 12. The power supply 100 may include a replaceable or rechargeable battery, a combustion engine, a generator, and electric motor, a solar panel, a chemical-reaction based power generation system, etc., or some combination thereof.

The robot may include a user interface 102, by which a user may set up or adjust various settings of the robot 12. The user interface may include one or more input devices (e.g., knobs, buttons, switches, dials, etc.) and in some cases may include a display (e.g., a screen, array of LEDs, etc.) for providing feedback to the user.

A network interface 104 enables communication with the remote server 16 via the cloud 18, or other devices (e.g., the docking station 20, a remote controller, a smart phone, a computing device, a tablet, etc.). For example, the network interface 104 may enable communication via a wireless network connection, a wired network connection, cellular data service, Bluetooth, Near Field Communication (NFC), ZigBee, ANT+, or some other communication protocol.

A sensing system 106 may include one or more sensors 107 (e.g., tactile, chemical, ultrasound, temperature, laser, sonar, camera, a red, blue, green, depth (RGB-D) camera, etc.). As discussed herein, the sensors 107 may be used to acquire sensed data corresponding to the sensor type and observation range that conveys information about the environment where the robot 12 is located.

A drive system 108 may actuate movement of the robot 12 through the air, through a liquid, along a surface, or some combination thereof. As shown, the drive system 108 may include one or more motors 110 and one or more encoders 112. The one or more motors 110 may drive propellers, legs, wheels, tracks, etc. The one or more encoders 112 may sense one or more parameters of the one or more motors 110 (e.g., rotational speed) and provide data to a control system 114.

The control system 114 may include one or more memory components 116 and one or more processors 118. A motion control system 120 may receive a signal from the one or more encoders 112 of the drive system 108 and output a control signal to the one or more motors 110 to control the movement of the robot 12. Similarly, a data collection control system 122 may control the operation of the sensing system 106 and receive data from the sensing system 106. The communication interface between the sensors 107 and the on-board processor 118 may be a standard industrial interface, including parallel bus, serial bus (I2C, SPI), and USB. A data processing and analysis system 124 may receive data collected by the sensing system 106 and process or analyze the collected data. In some embodiments, the data processing and analysis system 124 may process and analyze the data to different extents, such as based on a sensor modality and/or based on network communication or transmission related criteria, such as network latency, available bandwidth, and so forth.

In certain embodiments, the data processing and analysis system 124 may perform pre-processing of the sensor data or a partial processing and analysis of the sensor data and then provide the sensor data for transmission to a remote server 16 for further processing and/or use in simulation processes, as discussed herein. In further embodiments, the robot 12 may transmit raw sensor data to the remote server(s) 16 for such uses.

The control system 114 may also include a mission planning component 126 that may autonomously or in coordination with a remote server 16 generate or update a mission plan and executes the mission plan (such as for the performance of an assigned task) by coordinating the various other components of the control system 114 and the robot 12. Such mission planning may be subject to override by a remote operator and/or may account for only a portion of a task routine, such as moving the robot to the asset location or between way points which, once reached, may allow for remote operator control or input. Alternatively, in other embodiments, the inspection routine may be largely automated and/or under control of the mission planning functionality and the operator inputs may be generally directed to overriding a planned action (such as based on simulated results as discussed herein) or to providing limited inputs to further performance of a task in a suitable or satisfactory manner.

Figure 3:
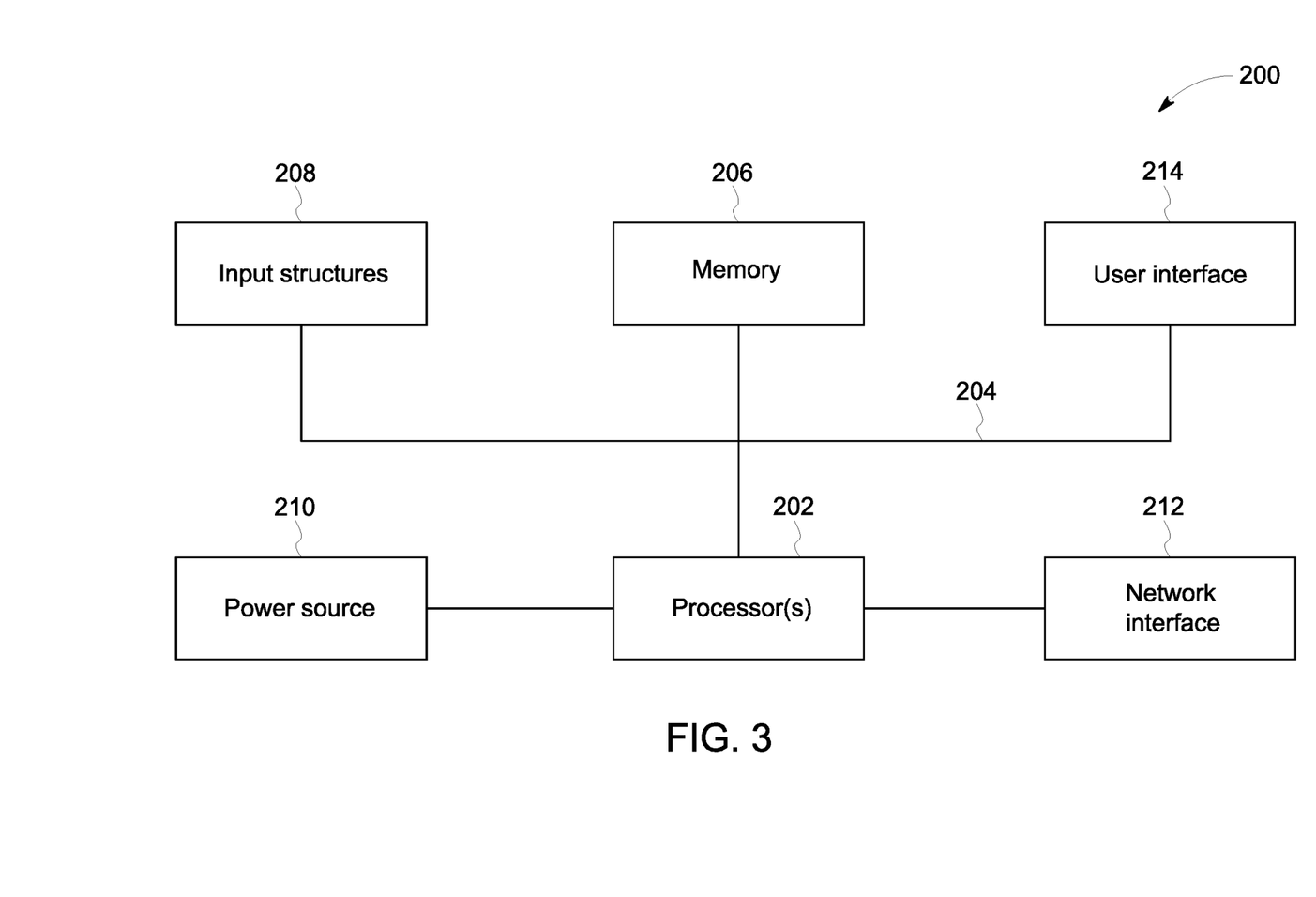
FIG. 3 is a block diagram of a processor based system suitable for use with the architecture of FIG. 1, in accordance with aspects of the present disclosure.

FIG. 3 generally illustrates a block diagram of example components of a computing device 200 that could be used as a remote server 16 and/or which may form the basis of a robot 12. As used herein, a computing device 200 may be implemented as the robot 12 and/or as one or more computing systems including laptop, notebook, desktop, tablet, or workstation computers, as well as server type devices or portable, communication type devices, such a cellular telephones, and/or other suitable computing devices.

As illustrated, the computing device 200 may include various hardware components, such as one or more processors 202, one or more busses 204, memory 206, input structures 208, a power source 210, a network interface 212, a user interface 214, and/or other computer components useful in performing the functions described herein.

The one or more processors 202 are, in certain implementations, microprocessors (e.g., CPUs, GPUs, and so forth) configured to execute instructions stored in the memory 206 or other accessible locations. Alternatively, the one or more processors 202 may be implemented as application-specific integrated circuits (ASICs), field-programmable gate arrays (FPGAs), and/or other devices designed to perform functions discussed herein in a dedicated manner. As will be appreciated, multiple processors 202 or processing components may be used to perform functions discussed herein in a distributed or parallel manner.

The memory 206 may encompass any tangible, non-transitory medium for storing data or executable routines, including volatile memory, non-volatile memory, or any combination thereof. Although shown for convenience as a single block in FIG. 3, the memory 206 may actually encompass various discrete media or types of media in the same or different physical locations. The one or more processors 202 may access data in the memory 206 via one or more busses 204.

The input structures 208 are used to allow a user to input data and/or commands to the device 200 and may include mice, touchpads, touchscreens, keyboards, VR controllers, motion or optical sensors, microphones, and so forth. The power source 210 can be any suitable source for providing power to the various components of the computing device 200, including line and battery power. In the depicted example, the device 200 includes a network interface 212. Such a network interface 212 may allow communication with other devices on a network using one or more communication protocols.

In the depicted example, the device 200 includes a user interface 214, such as a display or virtual reality headset configured to display images or data and/or speakers configured to play sound or acoustic data provided by the one or more processors 202. By way of example, the user interface 214 may encompass a display panel used to display a representation of the environment in which the robot 12 is currently located and/or one or more simulations depicting the results of a contemplated action by the robot 12, either or both of which may be generated based on sensor data provided by the robot 12.

As will be appreciated, in a real-world context one or more processor-based systems, such as the computing device 200 of FIG. 3, may be employed to implement some or all of the present approach.

With the preceding context in mind, the present approach relates to facilitating remote operation of a robot 12, such as by generating simulations that may be evaluated by a human operator in assessing instructions to be provided to one or more robots 12.

Figure 4:
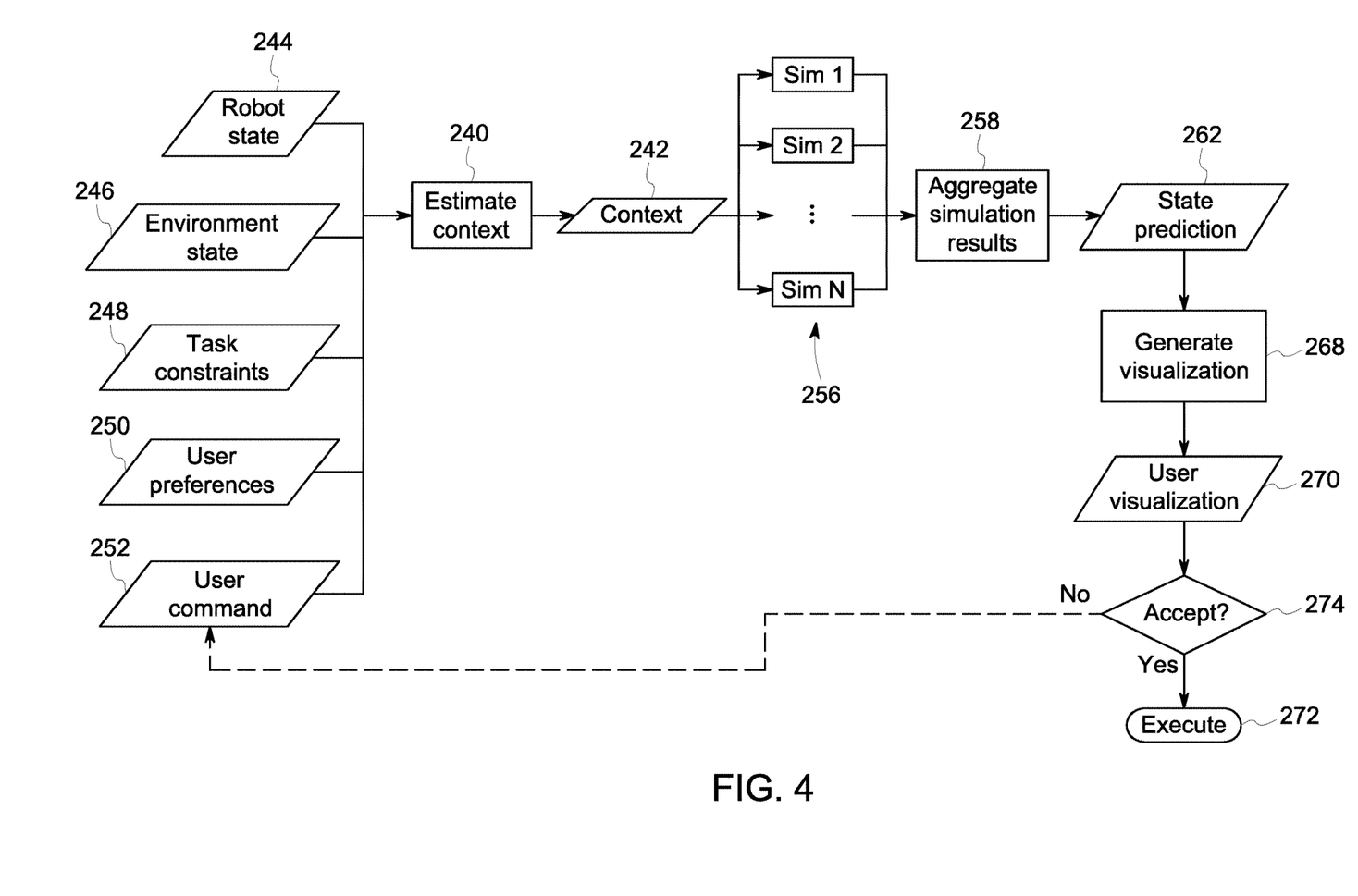
FIG. 4 depicts a process flow for context-based simulation of robotic actions, in accordance with aspects of the present disclosure.

In accordance with this approach, and turning to FIG. 4, a process flow view illustrates aspects of the present approach. As discussed herein, performance of certain of the routines illustrated in FIG. 4 may occur on the robot 12, while others occur on a remote server 16. For example, context estimation as discussed below may occur on the robot 12, while downstream processes (e.g., simulation, state prediction, and visualization) occur on the remote server 16. Alternatively, all processes up through operator visualization may occur on the robot 12, with visualization occurring at the remote server 16. Conversely, all routines including context estimation may occur at the remote server 16, with the robot 12 merely conveying certain data, such as sensor and measurement date relevant to the state of the robot and/or environment. That is, a range of implementation configurations, that may vary based on situational factors, may influence where a routine or process is performed, while still being within the scope of the present disclosure.

With the preceding in mind, the depicted example of a process flow includes three stages: a context estimation stage, a context-driven simulation stage, and a state prediction stage. As used herein, a context may be understood to be a function of the state of the robot and the intent of the human operator and may be based on environmental or sensed conditions and/or defined tasks as well. For example, based on the location of the robot near a valve and an instruction to move closer to the valve, a context may be algorithmically inferred that the operator intends for the robot to operate the valve. In certain implementations, a library of contexts may exist or be generated that can be referenced to ascertain a context based on factors described below.

With respect to context estimation, at this stage one or more algorithms determine or estimate (block 240) a context 242 in which a robot 12 is executing based on one or more factors. Examples of such factors include, but are not limited to, a robot state 244 (e.g., limb joint angles, limb joint torque, position of the robot, orientation of the robot, and so forth), an environment state 246 (e.g., objects identified or of interest in the sensor range of the robot), one or more task constraints 248 (e.g., for an assigned task, limitations or requirements specified for actions by the robot), one or more operator preferences 250 (may be operator specific or specific to a class of operator, may be based on prior history of communication with an operator), one or more operator commands 252 (e.g., high-level or specific action commands received from an operator), and so forth. As will be appreciated, information or values for certain of these factors may be readily determined or ascertained (e.g., task constraints 248, user preferences 250, user commands 252, and so forth). Other factors, however, may be inferred, such as from sensor or measurement data acquired using sensors 107 or instrumentation on the robot 12.

As may be appreciated, certain sensed or measured factors, such as robot state 244 and/or environment state 246 may include some degree of uncertainty, such as due to the uncertainty typically associated with a given sensor or instrumentation reading. As discussed herein, such uncertainty may be propagated through the described process, such as through the simulation algorithms and the resulting prediction(s). In such examples, such uncertainty may be expressed as confidence or confidence bands or as other probabilistic expressions. In some embodiments, if uncertainty exceeds a specified threshold for a given stage, such as the prediction stage, a warning or indicator may be provided to the operator to consider in determining a course of action.

In certain embodiments, deep learning techniques may be employed to estimate context 242 at block 240. As used herein, deep learning techniques (which may also be known as deep machine learning, hierarchical learning, or deep structured learning) are a branch of machine learning techniques that employ mathematical representations of data and artificial neural network for learning. By way of example, deep learning approaches may be characterized by their use of one or more algorithms to extract or model high level abstractions of a type of data of interest. This may be accomplished using one or more processing layers, with each layer typically corresponding to a different level of data abstraction and, therefore potentially employing or utilizing different aspects of the initial data or outputs of a preceding layer (i.e., a hierarchy or cascade of layers) as the target of the processes or algorithms of a given layer. In a data analysis context, this may be characterized as different layers corresponding to the different feature levels or levels of abstraction in the data.

In general, the processing from one level or abstraction to the next can be considered as one 'stage' of the analysis process. Each stage of the analysis can be performed by separate neural networks or by different parts of one larger neural network. For example, as discussed herein, a single deep learning network may cover all stages in an analytic process (e.g., from an initial input to an output data set). Alternatively, separate distinct deep learning network(s) may each cover only one stage (or a subset of stages) of the overall analysis process.

As part of the initial training of deep learning processes to solve a particular problem, training data sets may be employed that have known initial values and known or desired values for a final output of the deep learning process. The training of a single stage may have known input values corresponding to one representation space and known output values corresponding to a next-level representation space. In this manner, the deep learning algorithms may process (either in a supervised or guided manner or in an unsupervised or unguided manner) the known or training data sets until the mathematical relationships between the initial data and desired output(s) are discerned and/or the mathematical relationships between the inputs and outputs of each layer are discerned and characterized. Similarly, separate validation data sets may be employed in which both the initial and desired target values are known, but only the initial values are supplied to the trained deep learning algorithms, with the outputs then being compared to the outputs of the deep learning algorithm to validate the prior training and/or to prevent over-training.

In the present context, an artificial neural network or comparable machine learning construct, may be trained using various factors as discussed herein (e.g., a robot state 244, an environment state 246, one or more task constraints 248, one or more user preferences 250, one or more user commands 252, and so forth) as potential inputs and various contexts 242 as outputs such that a trained network can receive a set of factors to determine a likely context capturing the intent of the human operator.

Figure 5:
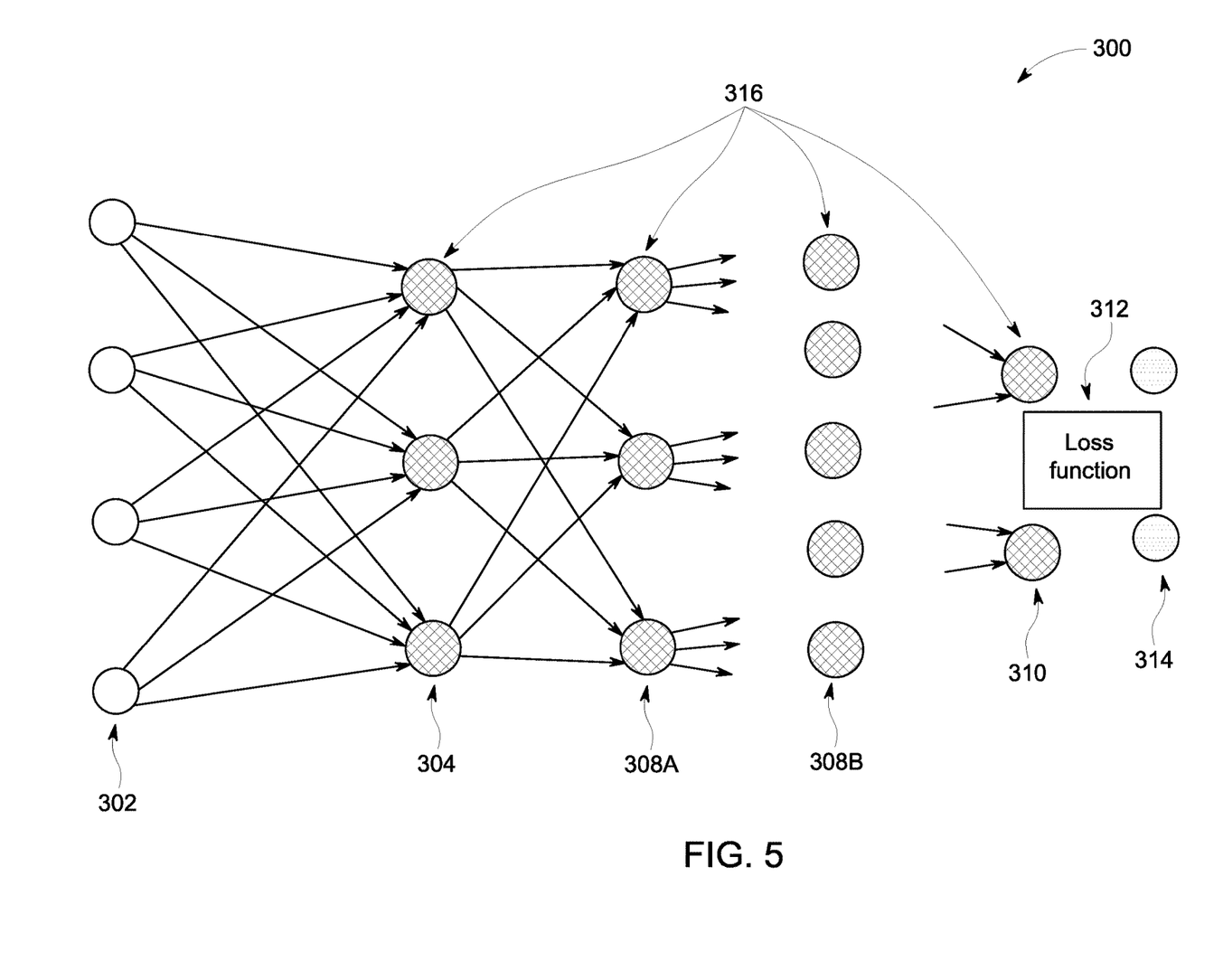
FIG. 5 depicts an example of an artificial neural network for training a deep learning model, in accordance with aspects of the present disclosure.

With the preceding in mind, FIG. 5 schematically depicts an example of an artificial neural network 300 that may be trained as a deep learning model as discussed herein. In this example, the network 300 is multi-layered, with a training input 302 (e.g., factors) and multiple layers including an input layer 304, hidden layers 308A, 308B, and so forth, and an output layer 310 and the training target 314 present in the network 300. Each layer, in this example, is composed of a plurality of "neurons" or nodes 316. The number of neurons 316 may be constant between layers or, as depicted, may vary from layer to layer. Neurons 316 at each layer generate respective outputs that serve as inputs to the neurons 316 of the next hierarchical layer. In practice, a weighted sum of the inputs with an added bias is computed to "excite" or "activate" each respective neuron of the layers according to an activation function, such as rectified linear unit (ReLU), sigmoid function, hyperbolic tangent function, or otherwise specified or programmed. The outputs of the final layer constitute the network output 310 which, in conjunction with a target value or construct 314, are used to compute some loss or error function 312, which will be backpropagated to guide the network training.

The loss or error function 312 measures the difference between the network output 310 and the training target 314. In certain implementations, the loss function may be a mean squared error (MSE). Alternatively, the loss function 312 could be defined by other metrics associated with the particular task in question, such as a softmax function.

With the preceding in mind, the neural network 300 may be trained for processing factors such as a robot state 244, an environment state 246, one or more task constraints 248, one or more user preferences 250, one or more user commands 252, and so forth to output a context 242 or a probabilistically ranked lists of contexts 242. As used herein a context 242 may be understood to be a task, operation, or action to be performed by the robot 12 that can be inferred from some or all of the state 244 of the robot, the robot's environment 246, instructions 252 or operator specific factors 250, and so forth.

Turning back to FIG. 4, a context 242 output from a trained neural network 300 as discussed herein may be used to adapt or parameterize one or more simulations 256 used to generate a prediction (e.g., a state prediction 262) corresponding to one or more of a predicted state of the robot 12, environment, and/or task. By way of example, based on the estimated context 242, simulation parameters may be chosen that optimize for the success of a respective task of interest.

In the depicted example, the system includes multiple (1 through N depicted) simulator instances that may each be tuned for different types of simulation 256. Types of simulation 256 include, but are not limited to, kinematic (e.g., self-collision, world-collision), dynamic, integration of closed-form equations of motion, and so forth. Tuning of a simulation 256, as used herein, means using stored simulation parameters that can faithfully reproduce the behavior of the robot 12. As discussed herein, simulation features, such as simulation of certain robot controllers or sensors, can be enabled or disabled based on applicability of the controllers or sensors in the estimated context 242. For instance, a safety controller pertaining to the robot base can be disabled when the base is not going to be moving. Similarly, a rear-facing camera does not need to be simulated when the robot 12 is manipulating something in front of it. In this manner, allocation of computational resources can be improved or optimized to allow real-time or better than real-time (i.e., predictive) simulation.

The context-driven simulation process may be parameterized not only for the successful completion of a respective task, but also can incorporate risk to specify the fidelity of various simulations 256. Such risk assessment as may relate to a proposed action may be derived or inferred from prior experience, empirical data, policy considerations, and so forth. For example, proposed actions deemed to be riskier (either qualitatively (e.g., risky, not risky) or as measured in as suitable quantitative metric) may cause higher fidelity simulations 256 to be parameterized. For instance, a simulation time step can be reduced to increase fidelity. The system can also trigger Monte Carlo simulations with different starting configurations, or simulation parameters, such as coefficients of friction, etc., to help with uncertainty, which as noted above, may be present and attributable to sensor or measurement data uncertainty.

In the depicted example, the results of the one or more simulations 256 are aggregated or otherwise combined (block 258) to derive the state prediction 262, which corresponds to a prediction of the state of one or more of a predicted state of the robot 12, environment, and/or task. Determination of the state prediction 262 may be based on an averaging or combination of the simulation results or on the most likely simulation result based on probabilistic considerations. Alternatively, the state prediction 262 may encompass a ranked or order range of state predictions 262, such as ordered based on likelihood. In the depicted example, the state prediction 262 is generated using simulation results aggregated from multiple (here, N) concurrently-running types of simulation 256, weighted by their relevance to the current action. As will be appreciated, in implementations where a single simulation approach is employed, no aggregation 258 may be performed, and instead the sole simulation result may be used to derive the state prediction 262.

In certain implementations, the system uses the result(s) of the simulations 256 along with sensory feedback from the robot 12 to predict the state (state prediction 262) of the robot, environment, and/or task. In one embodiment this information is combined with the user intent and the forward simulation to predict the state of the robot (or range of states, when considering uncertainty) as it carries out the contemplated action(s).

Based on the predicted state 262, a visualization 270 or other presentation may be generated (block 268) that relates the outcome of a proposed user instruction based on the estimated context 242 and simulated results. Based on the visualization 270, an operator may (at decision block 274) accept or confirm the instruction (execute block 272), causing the robot 12 to receive the instruction) or may reject or modify the instruction, such as by sending the robot 12 a different instruction. In this manner, the results of a contemplated instruction may be previewed by the operator to confirm a suitable instruction is sent, which may be beneficial in a high-latency environment where real-time control and feedback is not feasible. It may be noted however, that the present approach may also be implemented in low- or no-latency environments, and in such scenarios provides an operator with the opportunity to preview the results of an instruction without committing to the instruction, which may be beneficial even in such non-high-latency contexts.

Technical effects of the invention include accurate prediction of system behavior using one or more types of simulation, some or all of which are parameterized or configured based upon a context derived using various measured or determinable factors. Fidelity of the simulation(s) may be adjusted to generate multiple alternate outcomes, which can be displayed to the operator. Commercial advantages include, but are not limited to, increased reliability associated with a teleoperated system. In addition, teleoperation may be viable for new use cases where it was not previously viable due to latency. Advantages also include reducing the computational resources needed adequately simulate robotic behavior.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A robot navigation system, comprising:
 a robot configured to be operated from a remote location, the robot comprising:
  one or more sensors;
  a processing component configured to:
   estimate a context based on one or more factors, wherein the estimation of the context is based at least on a state of the robot and an action to be performed by the robot for which an unconfirmed instruction to perform the action has been received by the processing component but not confirmed by an operator;
   based on the context, parameterize or adapt two or more simulation routines that simulate the robot performing the action;
   execute the two or more simulations routines;
   aggregate results of the two or more simulation routines to generate a state prediction corresponding to one or more of a predicted state of the robot, environment, or task;
   generate an output based on the state prediction for review by the operator, wherein the output conveys a predicted outcome of performing the action; and
   receive a confirmation or a rejection of the unconfirmed instruction from the operator in response to the output.

2. The robot navigation system of claim 1, wherein the state of the robot comprises one or more of limb joint angles, limb joint torque, robot position, or robot orientation.

3. The robot navigation system of claim 1, wherein the context corresponds to at least a state of the robot and an intent of the operator.

4. The robot navigation system of claim 1, wherein estimation of the context is based on some or all of the state of the robot, one or more environment states, one or more task constraints, one or more operator preferences, or one or more operator instructions.

5. The robot navigation system of claim 1, wherein the context is estimated using a trained artificial neural network.

6. The robot navigation system of claim 1, wherein the one or more simulation routines are parameterized based on the context to optimize the likelihood of success of a task of interest.

7. The robot navigation system of claim 1, wherein generating the output comprises generating a visualization depicting an outcome of the action.

8. The robot navigation system of claim 1, wherein parameterizing or adapting the one or more simulation routines comprises disabling simulation related to one or more controllers or sensors based on the context so as to exclude the one or more controllers or sensors from simulation based on the context.

9. The robot navigation system of claim 1, wherein parameterizing or adapting the one or more simulation routines comprises specifying a fidelity of at least one of the simulation routines based on a risk factor associated with a respective task, wherein the fidelity is parameterized or adapted to be higher the greater the risk factor.

10. The robot navigation system of claim 1, wherein the state prediction is generated based on the results of the one or more simulation routines and on feedback generated using the one or more sensors.

11. The robot navigation system of claim 1, further comprising receiving a user input confirming the previously unconfirmed instruction so that the robot performs the action.

12. A processor-based method for remotely operating a robot, comprising:
   for an unconfirmed instruction for the robot to perform an action, estimating a context based on one or more factors, wherein the estimation of the context is based at least on a state of the robot and the action indicated by the unconfirmed instruction;
   based on the context, parameterizing or adapting two or more processor-implemented simulation routines that simulate the robot performing the action;
   executing the two or more simulation routines;
   aggregating results of the two or more simulation routines to generate a state prediction corresponding to one or more of a predicted state of the robot, environment, or task; and
   generating an output based on the state prediction for review by an operator, wherein the output conveys a predicted outcome of performing the action; and
   receiving a confirmation or a rejection of the unconfirmed instruction from the operator in response to the output.

13. The processor-based method of claim 12, wherein the state of the robot comprises one or more of limb joint angles, limb joint torque, robot position, or robot orientation.

14. The processor-based method of claim 12, wherein estimation of the context is based on some or all of the state of the robot, one or more environment states, one or more task constraints, one or more operator preferences, or one or more operator instructions.

15. The processor-based method of claim 12, wherein the state prediction corresponds to one or more of a predicted state of the robot, environment, or task.

16. The processor-based method of claim 12, wherein generating the output comprises generating a visualization depicting an outcome of the action.

17. One or more non-transitory computer-readable media encoding processor-executable routines, wherein the routines, when executed by a processor, cause acts to be performed comprising:
   estimating a context based on one or more factors, wherein the estimation of the context is based at least on a state of a robot and an action to be performed by the robot for which an unconfirmed instruction to perform the action has been received by the processor but not confirmed by an operator;
   based on the context, parameterizing or adapting two or more processor-implemented simulation routines that simulate the robot performing the action;
   executing the two or more simulations routines;
   aggregating results of the two or more simulation routines to generate a state prediction corresponding to one or more of a predicted state of the robot, environment, or task;
   generating an output based on the state prediction for review by the operator, wherein the output conveys a predicted outcome of performing the action; and
   receiving a confirmation or a rejection of the unconfirmed instruction from the operator in response to the output.

18. The one or more non-transitory computer-readable media of claim 17, wherein generating the output comprises generating a visualization depicting an outcome of the action.

19. The robot navigation system of claim 1, wherein parameterizing or adapting the one or more simulation routines comprises parameterizing or adapting the one or more simulation routines to propagate uncertainty associated with one or more sensed or measured factors through the respective simulations to the respective simulation results.

20. The robot navigation system of claim 1, wherein each simulation routine comprises a different type of simulation.

* * * * *